United States Patent
Li et al.

(10) Patent No.: US 12,101,152 B2
(45) Date of Patent: Sep. 24, 2024

(54) CHANNEL CONSTRUCTION FOR UNSOUNDED MIMO CHANNEL

(71) Applicant: Telefonaktiebolaget LM Ericsson (PUBL), Stockholm (SE)

(72) Inventors: Shaohua Li, Kanata (CA); Jianguo Long, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 347 days.

(21) Appl. No.: 17/631,051

(22) PCT Filed: Aug. 1, 2019

(86) PCT No.: PCT/IB2019/056587
§ 371 (c)(1),
(2) Date: Jan. 28, 2022

(87) PCT Pub. No.: WO2021/019290
PCT Pub. Date: Feb. 4, 2021

(65) Prior Publication Data
US 2022/0329302 A1  Oct. 13, 2022

(51) Int. Cl.
*H04B 7/06* (2006.01)
*H04L 5/00* (2006.01)

(52) U.S. Cl.
CPC ......... *H04B 7/0626* (2013.01); *H04B 7/0634* (2013.01); *H04B 7/0639* (2013.01); *H04L 5/0051* (2013.01)

(58) Field of Classification Search
CPC ............... H04B 7/0626; H04B 7/0634; H04B 7/0639; H04L 5/0051
See application file for complete search history.

(56) References Cited

U.S. PATENT DOCUMENTS

| | | | |
|---|---|---|---|
| 9,078,142 B1 | 7/2015 | Zhan et al. | |
| 2014/0328247 A1 | 11/2014 | Silverman et al. | |
| 2018/0278316 A1* | 9/2018 | Yang | H04B 7/0617 |
| 2018/0287757 A1* | 10/2018 | Onggosanusi | H04L 5/0053 |

(Continued)

OTHER PUBLICATIONS

3GPP TSG RAN WG1 NR Ad-Hoc#3; Nagoya, Japan; Source: Huawei, HiSilicon; Title: Partial reciprocity based CSI acquisition mechanism (R1-1715722)—Sep. 18-21, 2017.

(Continued)

*Primary Examiner* — Jung H Park
(74) *Attorney, Agent, or Firm* — Baker Botts L.L.P.

(57) ABSTRACT

According to certain embodiments, a method for use in a network node for constructing an unsounded channel in a wireless network wherein the network node comprises more antennas than a wireless device and the wireless device comprises more than one receive antenna comprises: receiving channel state information (CSI) feedback and a sounded reference signal from the wireless device; estimating a sounded channel from the sounded reference signal; deriving a partial downlink channel based on the sounded reference signal; constructing an unsounded channel as a function of the CSI feedback and the partial downlink channel; concatenating the sounded channel and unsounded channel into a full channel; and transmitting a wireless signal to the wireless device using the full channel for beamforming or link adaptation.

18 Claims, 8 Drawing Sheets

(56) References Cited

U.S. PATENT DOCUMENTS

2018/0323846 A1* 11/2018 Tsai ..................... H04B 7/0617
2022/0311492 A1* 9/2022 Wu ....................... H04L 5/0051

OTHER PUBLICATIONS

PCT International Serach Report issued for International application No. PCT/IB2019/056587—Feb. 24, 2020.
PCT Written Opinion of the International Searching Authority issued for International application No. PCT/IB2019/056587—Feb. 24, 2020.

* cited by examiner

CHANNEL CONSTRUCTION FOR UNSOUNDED MIMO CHANNEL

PRIORITY

This nonprovisional application is a U.S. National Stage Filing under 35 U.S.C. § 371 of International Patent Application Serial No. PCT/IB2019/056587 filed Aug. 1, 2019 and entitled "CHANNEL CONSTRUCTION FOR UNSOUNDED MIMO CHANNEL" which is hereby incorporated by reference in its entirety.

TECHNICAL FIELD

Embodiments of the present disclosure are directed to wireless communications and, more particularly, to channel construction for new radio (NR) unsounded channel in reciprocity-based massive multiple-input multiple-output (MIMO) wireless transmission.

BACKGROUND

Massive multiple-input multiple-output (MIMO) is one of the key technologies adopted by Third Generation Partnership Project (3GPP) fourth generation (4G) long term evolution (LTE) and fifth generation (5G) new radio (NR) to enhance wireless network performance and capacity. A typical massive MIMO system consists of two-dimensional antenna elements array with M rows, N columns and K polarizations (K=2 in case of cross-polarization) as illustrated in FIG. 1.

Reciprocity is one key characteristic of a time division duplex (TDD) system. TDD reciprocity may be used to fully explore massive MIMO capacity. In current commercial 4G or 5G systems, most of the base stations use TDD reciprocity to perform downlink beamforming. Because of channel reciprocity, a base station such as a gNB can derive the downlink channel based on an uplink channel, and the uplink channel is estimated by an uplink reference signal, e.g., a demodulation reference signal (DMRS) or a sounding reference signal (SRS).

Obtaining a full reciprocity channel, however, is not feasible because of the limitation of terminal cost and size. For example, most commercial NR user equipment (UE) have four receive antennas, but only have one or two transmit antennas. Increasing transmit antennas incurs a substantial cost for commercial UEs.

Some UE may use antenna switching to perform uplink sounding to assist a gNB in obtaining a full downlink channel. With antenna switching, the UE sounds only one received branch in one given transmission time interval (TTI) and switches to another received branch in another TTI. After several TTIs, the UE can sound all the received branches and thus the gNB can obtain the channels for all the received branches. Antenna switching, however, adds additional cost for UE vendors. Thus, most UE vendors do not support antenna switching.

Therefore, for most commercial UEs, the gNB can only obtain a partial sounding channel. For example, assume a base station is equipped with 64 antennas (M×N×K=64) and a UE is configured with 1 transmit antenna and 4 received antenna. The base station can only obtain a downlink channel from all base station antennas to one receive antenna and cannot obtain the downlink channels to the other three receive antennas that are not sounded.

SUMMARY

Based on the description above, there currently exist certain challenges with channel construction for new radio (NR) unsounded channels in reciprocity-based massive multiple-input multiple-output (MIMO) wireless transmission. For example, channel construction is one key part for the reciprocity-based MIMO schemes when a user equipment (UE) does not support a full channel sounding reference signal (SRS). In existing solutions, channel construction for an unsounded channel is based on the obtained sounded channel. These solutions, however, can only be applied to UEs equipped with two receive antennas. In the case of two receive antennas, the solutions can achieve relatively good performance for a given channel. For NR, however, most UE are equipped with four receive antennas. How to construct the channel (and how to construct the channel for robust performance) for the unsounded channel is undefined.

Particular embodiments describe several channel construction methods. Simulation results show that the proposed channel construction methods can achieve relatively good performance. More specifically, particular embodiments construct an unsounded channel for reciprocity-based massive MIMO schemes.

In general, particular embodiments include: (a) acquiring UE channel state information (CSI) feedback and partial sounded downlink channel based on sounded reference signal; (b) constructing the unsounded channel based on the acquired UE CSI feedback and partial sounded downlink channel; and (c) concatenating the constructed channel and the sounded channel into to a full channel.

In some embodiments, constructing the unsounded channel comprises: (a) ordering the columns of the reported precoding matrix indicator (PMI) or variant of reported PMI; (b) down-selecting the columns from the reported PMI or variant of reported PMI; (c) projecting the down-selected columns or their variant in the nulling space of sounded channel or the variant of sounded channel; and (d) scaling the projected channel to make the constructed channel power comparable with the sounded channel of the variant of sounded channel to get the constructed channel for unsounded channel.

In some embodiments, constructing the unsounded channel further comprises: (a) acquiring the right singular vectors or the approximation of the right singular vectors of channel based on obtained sounded channel; (b) deriving the linear combination weights based on the UE CSI feedback and the obtained sounded channel; and (c) constructing the channel for unsounded channel based on the acquired right singular vectors and the derived linear combination weights.

According to some embodiments, a method for use in a network node for constructing an unsounded channel in a wireless network wherein the network node comprises more antennas than a wireless device and the wireless device comprises more than one receive antenna comprises: receiving CSI feedback and a sounded reference signal from the wireless device; estimating a sounded channel from the sounded reference signal; deriving a partial downlink channel based on the sounded reference signal; constructing an unsounded channel as a function of the CSI feedback and the partial downlink channel; concatenating the sounded channel and unsounded channel into a full channel; and transmitting a wireless signal to the wireless device using the full channel for beamforming or link adaptation.

In particular embodiments, constructing the unsounded channel as a function of the CSI feedback and the partial downlink channel comprises: ordering columns of a PMI, or a variant of the PMI, included in the received CSI feedback; down-selecting a subset of the ordered columns; projecting the down-selected columns in a nulling space of the partial downlink channel; and scaling the projection so that constructed unsounded channel is power comparable with the partial downlink channel.

In particular embodiments, constructing the unsounded channel as a function of the CSI feedback and the partial downlink channel comprises: ordering columns of a PMI, or a variant of the PMI, included in the received CSI feedback; down-selecting a subset of the ordered columns; obtaining a channel characteristic based on the sounded channel; acquiring an approximation of right singular vectors based on the obtained channel characteristic; constructing an intermediate matrix based on a subset of the approximation of right singular vectors and the down-selected columns; decomposing the intermediate matrix to obtain linear combination weights; and determining the unsounded channel based on the subset of the approximation of right singular vectors and the obtained linear combination weights.

In particular embodiments, ordering the columns of the PMI, or the variant of the PMI, comprises ordering each PMI, or variant of the PMI, column based on its distance from the sounded channel. Down-selecting the subset of ordered columns may comprise filtering out PMI columns associated with the partial downlink channel. The channel characteristic may comprise a transmitter correlation matrix. The transmitter correlation matrix may be based on an estimated downlink channel for a first polarization or for a first polarization and a second polarization.

In particular embodiments, acquiring the approximation of the right singular vectors comprises acquiring the right singular vectors by singular value decomposition (SVD) or eigen value decomposition or acquiring a subset of vectors comprising the first dominant singular vectors.

In some embodiments, a network node is operable to construct an unsounded channel in a wireless network. The network node comprises more antennas than a wireless device and the wireless device comprises more than one receive antenna. The network node comprises processing circuitry operable to perform any of the methods performed by the network node described above.

In some embodiments, a network node is operable to construct an unsounded channel in a wireless network. The network node comprises more antennas than a wireless device and the wireless device comprises more than one receive antenna. The network node comprises a receiving module, a determining module, and a transmitting module. The receiving module is operable to receive CSI feedback and a sounded reference signal from the wireless device. The determining module is operable to: estimate a sounded channel from the sounded reference signal; derive a partial downlink channel based on the sounded reference signal; construct an unsounded channel as a function of the CSI feedback and the partial downlink channel; and concatenate the sounded channel and unsounded channel into a full channel. The transmitting module is operable to transmit a wireless signal to the wireless device using the full channel for beamforming or link adaptation.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments are applicable to any antenna configuration, are robust for any channel conditions, and achieve good performance even with partial sounded channels.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, Third Generation Partnership Project (3GPP) fourth generation (4G) long term evolution (LTE) and fifth generation (5G) new radio (NR) networks may use massive multiple-input multiple-output (MIMO) to enhance wireless network performance and capacity. There exist certain challenges, however, with channel construction for NR unsounded channels in reciprocity-based massive MIMO wireless transmission. For example, existing channel construction solutions for an unsounded channel are based on the obtained sounded channel. These solutions, however, can only be applied to user equipment (UEs) with two receive antennas. For NR, however, most UE are equipped with four receive antennas.

Particular embodiments described herein obviate the problems described above and include methods, apparatus, and systems to construct an unsounded channel for reciprocity-based massive MIMO schemes.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Figure 2:
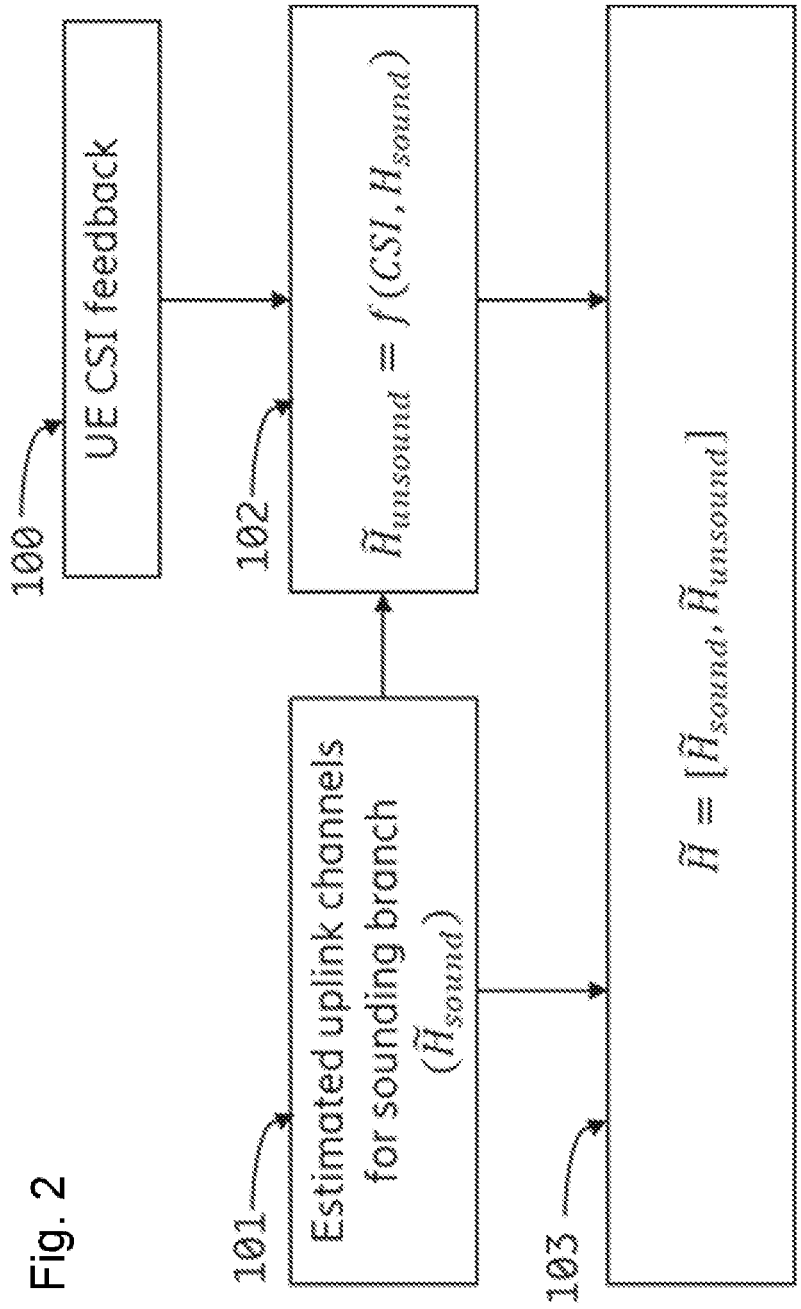
FIG. 2 is a flow diagram illustrating an example channel construction method, according to some embodiments.

FIG. 2 is a flow diagram illustrating an example channel construction method, according to some embodiments. To construct the unsounded channel, a network node such as a gNB acquires UE channel state information (CSI) feedback, as illustrated in block 100.

In block 100, CSI feedback may include a precoding matrix indication (PMI), rank indication (RI), channel quality index (CQI), beam index. etc. The CSI feedback may be based on type-1 codebook-based feedback or type-II codebook-based feedback. In some embodiments, the CSI feedback is based on single-panel or multiple panel feedback. The feedback may be based on beamformed CSI-RS or non-beamformed CSI-RS.

At block 101, the base station estimates the uplink channel from the sounding branch and further derives a partial downlink channel for the sounding branch. The estimation is based on an uplink reference signal.

The reference signal may comprise on one or more of a demodulation reference signal (DMRS), sounding reference signal (SRS), physical random access channel (PRACH), or any other uplink reference signal. The uplink sounding channel may comprise the actual channel or a transform of the actual channel. As one example of a transform, it can be obtained by multiplying a discrete Fourier transform (DFT) matrix and the actual channel.

At block 102, based on UE CSI feedback and estimated partial downlink channel, the network node derives the constructed channel for the unsounded branch. In block 102, $f(\cdot)$ is a function. More detailed descriptions of $f(\cdot)$ are found below with respect to FIGS. 3 and 4.

At block 103, the network node concatenates the sounded channel and constructed channel into the full channel. The full channel may be used for beamforming or link adaptation.

Figure 3:
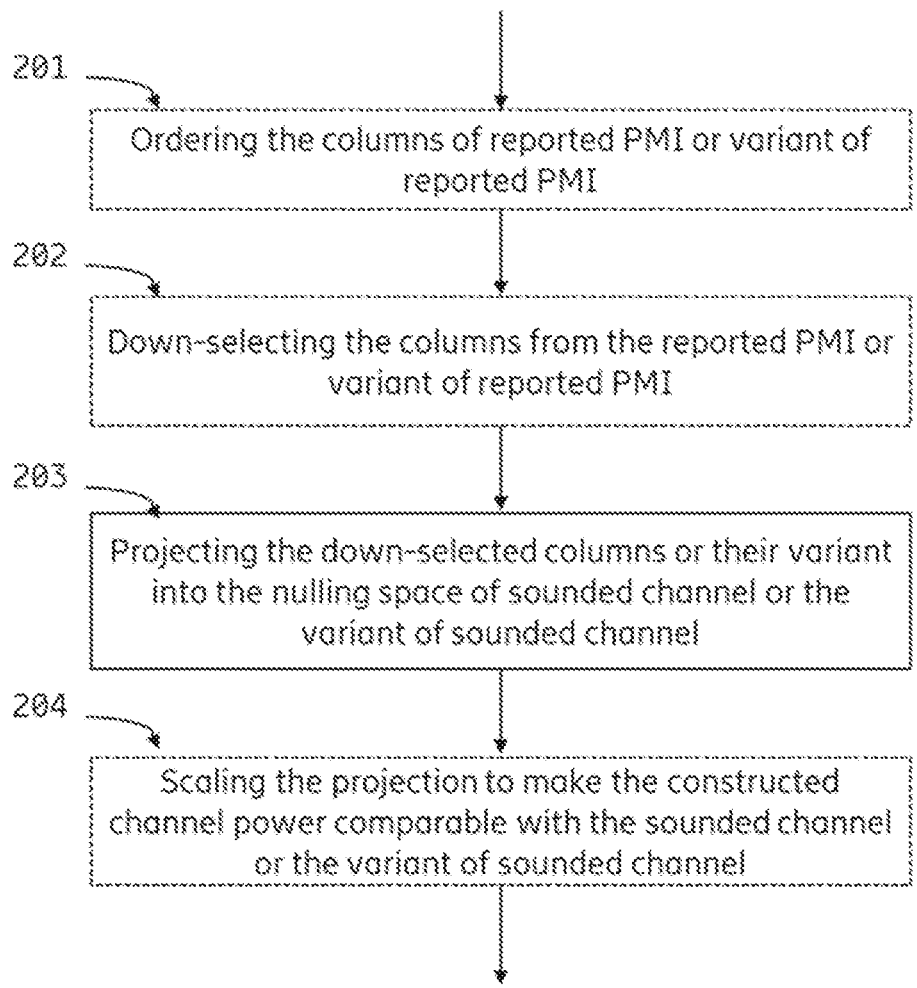
FIG. 3 is a flow diagram illustrating an example method for constructing an unsounded channel as a function of the CSI feedback and the partial downlink channel, according to some embodiments.

FIG. 3 is a flow diagram illustrating an example method for constructing an unsounded channel as a function of the CSI feedback and the partial downlink channel (i.e., the function $f(\cdot)$ described above), according to some embodiments.

$W_{PMI}$ denotes the precoding weights corresponding to UE reports PMI. The CSI-RS is beamformed using beamforming weights $W_{p2a}$. The effective PMI feedback is given as $W_{eff}=W_{p2a}W_{PMI}$, where $W_{PMI}$ is a $N_{port} \times N_{rank}$ matrix and $W_{p2a}$ is a $N_t \times N_{port}$ matrix, $N_{port}$ is the number of CSI-RS ports, and $N_{rank}$ is the reported rank, $N_t$ is the number of transmitted antenna.

In block 201 and block 202 of FIG. 3, the variant of reported PMI can be given by $W_{eff}$. In case $W_{p2a}$ is the identity matrix, $W_{eff}$ is equal to $W_{PMI}$, thus, the reported PMI can be directly used for column manipulating in block 201 and block 202.

Let $W_{eff}^{(i)}(=0, \ldots, N_{rank}-1)$ be the ith column of $W_{eff}$, in block 201, $W_{eff}^{(i)}(i=0, \ldots, N_{rank}-1)$ is sorted. As one example for the sorting, $W_{eff}^{(i)}(i=0, \ldots, N_{rank}-1)$ is ordered in ascending order according to the distance between $\tilde{H}_{sound}^{H}$ and $conj(W_{eff}^{(i)})$.

In block 202, the first $N_{unsound}$ ordered $W_{eff}^{(i)}$ are selected to form a submatrix of $W_{eff}$, defined as $W_{eff}^{(sel)}$.

In block 203, the down-selected columns are projected to the nulling space of sounded channel $\tilde{H}_{sound}$. The projected matrix is defined as $W_{eff}^{(proj)}$.

In block 204, the projected matrix $W_{eff}^{(proj)}$ may be scaled so that the energy of the constructed channel is comparable with the sounded channel. As one example implementation, it can be given as $\tilde{H}_{unsound}=\beta \cdot W_{eff}^{(proj)}$ where $\beta$ is associated with the sounded channel. In other embodiments, the projected matrix may not be scaled.

Figure 4:
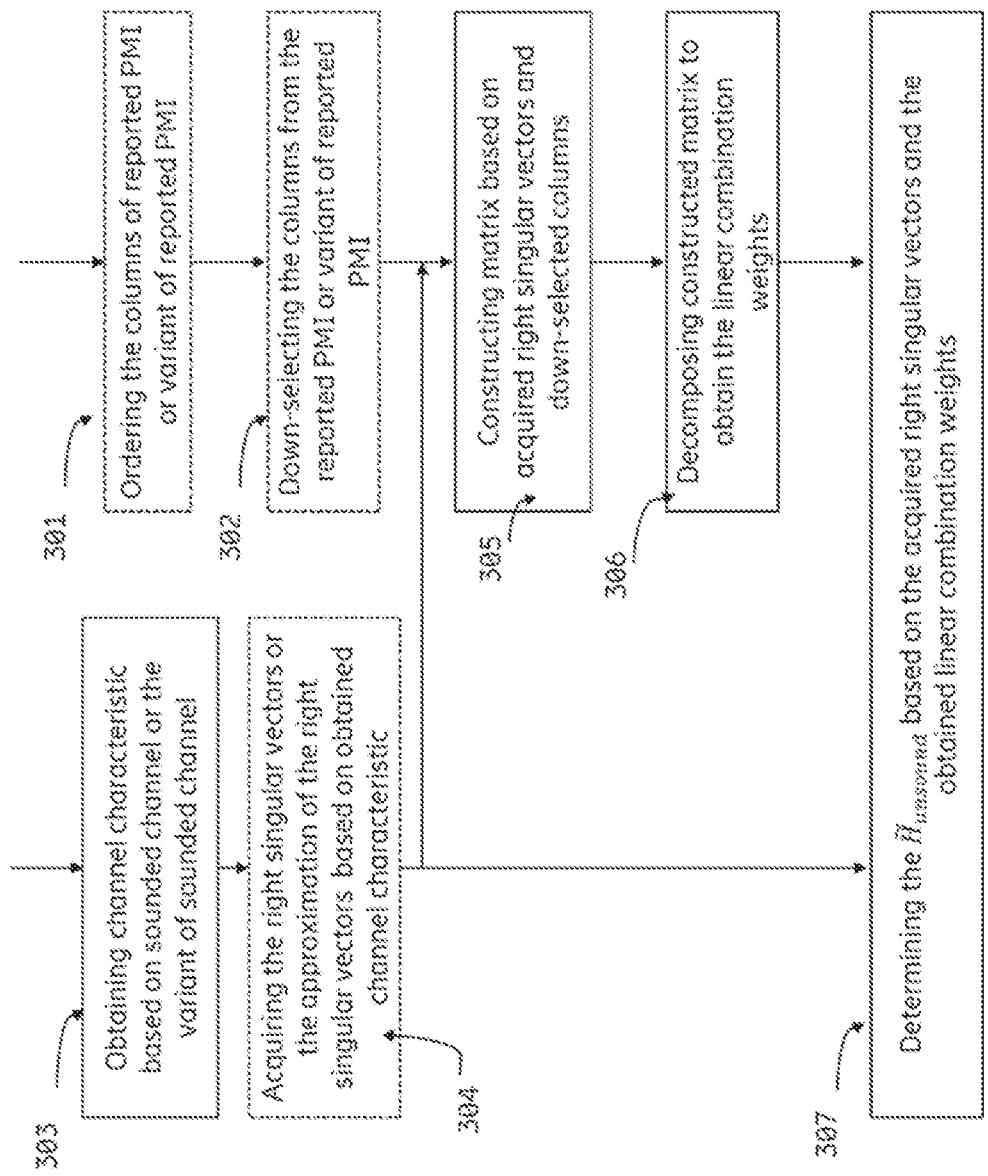
FIG. 4 is a flow diagram illustrating another example method for constructing an unsounded channel as a function of the CSI feedback and the partial downlink channel, according to some embodiments.

FIG. 4 is a flow diagram illustrating another example method for constructing an unsounded channel as a function of the CSI feedback and the partial downlink channel (i.e., the function $f(\cdot)$ described above), according to some embodiments.

In block 303, a channel characteristic is obtained based on the sounded channel or the variant of sounded channel. As one example for the channel characteristic, the transmitter correlation matrix can be given by $$R = \frac{1}{N_{sub}} \sum_{k=0}^{Nsub} h_{p_0}^H(k) \times h_{p_0}(k)$$

where $h_{P_0}(k)$ is the estimated downlink channel for the first polarization on the kth subcarrier. $h_{P_0}(k)$ is with $$\frac{N_t}{2} \times N_{sount}$$

dimension. To improve the accuracy, in some embodiments the correlation matrix can also be given as $$R = \frac{1}{2N_{sub}} \left( \sum_{i=0}^{1} \sum_{k=0}^{Nsub} h_{p_i}^H(k) \times h_{p_i}(k) \right)$$

where $h_{P_1}(k)$ is the estimated downlink channels for the second polarization on the kth subcarrier and is with $$\frac{N_t}{2} \times N_{sount}$$

dimension.

In block 304, the right singular vectors or the approximation of the right singular vectors can be acquired based on the obtained channel characteristic. As one example, the right singular vectors can be obtained by Singular Value Decomposition (SVD) or eigen value decomposition, or other methods to estimate the right singular vectors.

Assume the right singular vectors are $V_{channel}^{(full)}$. Thus, the dimension of $V_{channel}^{(full)}$ is $$\frac{N_t}{2} \times \frac{N_t}{2}.$$

To reduce the complexity or increase the algorithm robustness, particular embodiments may keep the right singular vectors corresponding the first several dominant singular values. These vectors are concatenated and defined as $V_{channel}$. In case $N_{base}$ dominant singular vectors are selected, the dimension of $V_{channel}$ is $$\frac{N_t}{2} \times N_{base}.$$

In block 301 and 302 may include similar steps as block 201 or block 202 described with respect to FIG. 3. Some embodiments may keep $W_{eff}$ without any ordering or down selection. In the down-selection of block 302, another down selection method is to select the first several columns of $W_{eff}$.

In block 305, one intermediate matrix can be constructed. One example of intermediate matrix construction method is given by $M=B*W_{eff}^{(sel)}*(W_{eff}^{(sel)})^H*B^H$ where B is given by $$B = \begin{bmatrix} V_{channel}^T & \\ & V_{channel}^T \end{bmatrix}.$$

In block 306, the constructed matrix M is decomposed to obtain the linear combination weights $\alpha=[\alpha_1, \alpha_2, \ldots, \alpha_{N_{unsound}}]$.

In block 307, $\tilde{H}_{unsound}$ is determined based on the acquired right singular vectors and the obtained linear combination weights. One example determination method is given by:

$$\tilde{H}_{unsound} = -\begin{bmatrix} conj(V_{channel}) \\ conj(V_{channel}) \end{bmatrix} \alpha$$

To get the comparable power with sounded channel, particular embodiments may scale $\tilde{H}_{unsound}$ with the amplitude of $$\tilde{H}_{sound} \text{ as } \tilde{H}_{unsound} = \gamma \begin{bmatrix} conj(V_{channel}) \\ conj(V_{channel}) \end{bmatrix} \alpha$$

where $\gamma$ is associated with sounded channel. In some embodiments, scaling is optional.

Figure 5:
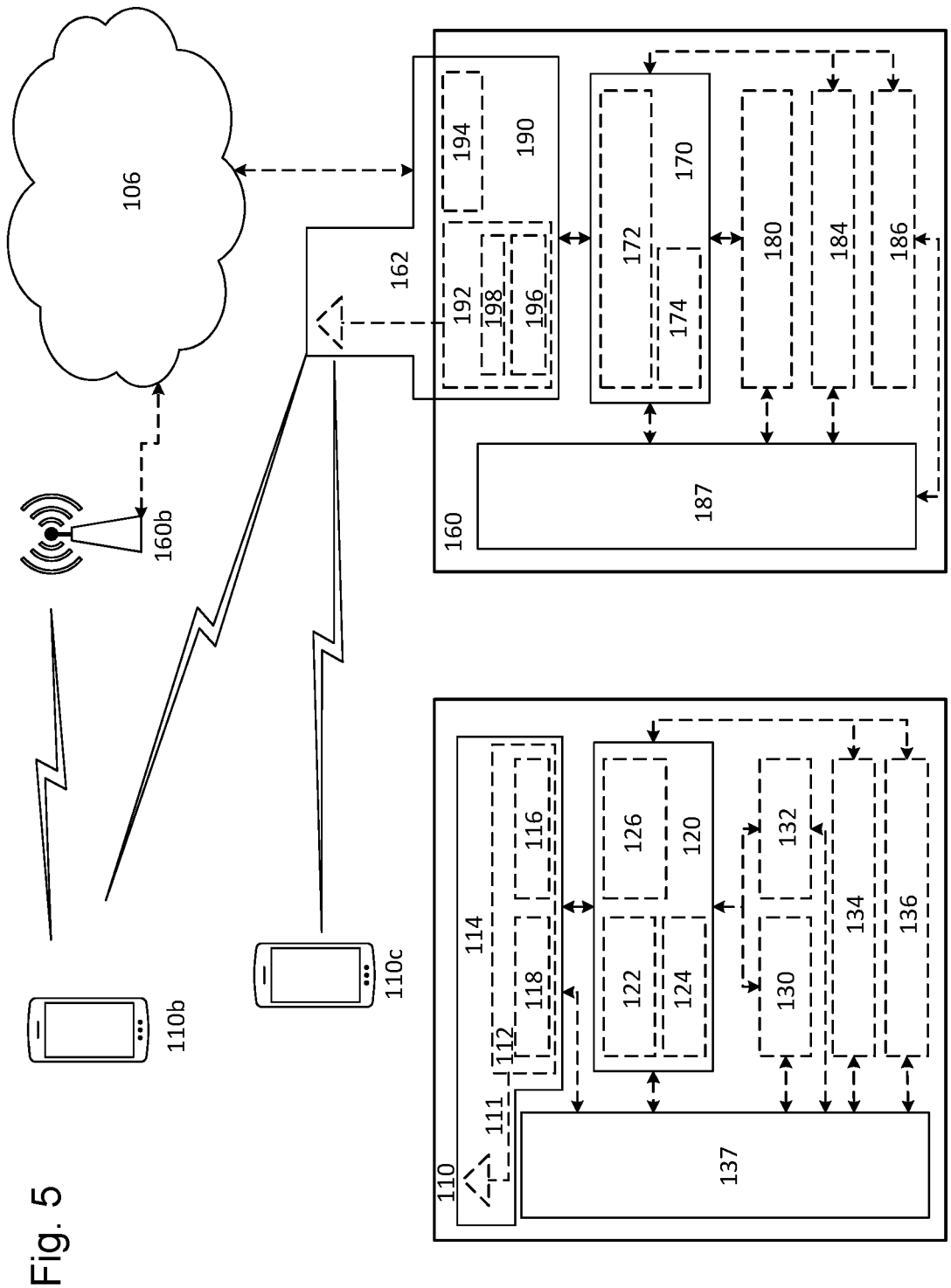
FIG. 5 is a block diagram illustrating an example wireless network.

FIG. 5 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node, such as the scheduling operations described herein and with respect of FIGS. 2-4. The operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation.

A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g. RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The communication system 106 may itself be connected to a host computer (not shown), which may be embodied in the hardware and/or software of a standalone server, a cloud-implemented server, a distributed server or as processing resources in a server farm. The host computer may be under the ownership or control of a service provider or may be operated by the service provider or on behalf of the service provider.

The communication system of FIG. 5 as a whole enables connectivity between one of the connected WDs 110 and the host computer. The connectivity may be described as an over-the-top (OTT) connection. The host computer and the connected WDs 110 are configured to communicate data and/or signaling via the OTT connection, using an access network, a core network, any intermediate network and possible further infrastructure (not shown) as intermediaries. The OTT connection may be transparent in the sense that at least some of the participating communication devices through which the OTT connection passes are unaware of routing of uplink and downlink communications.

The host computer may provide host applications which may be operable to provide a service to a remote user, such as a WD 110 connecting via an OTT connection terminating at the WD 110 and the host computer. In providing the service to the remote user, the host application may provide user data which is transmitted using the OTT connection. The "user data" may be data and information described herein as implementing the described functionality. In one embodiment, the host computer may be configured for providing control and functionality to a service provider and may be operated by the service provider or on behalf of the service provider. The host computer may be enabled to observe, monitor, control, transmit to and/or receive from the network node 160 and or the wireless device 110.

One or more of the various embodiments in this disclosure improve the performance of OTT services provided to the WD 110 using the OTT connection. More precisely, the teachings of some of these embodiments may improve the data rate, latency, and/or power consumption and thereby provide benefits such as reduced user waiting time, relaxed restriction on file size, better responsiveness, extended battery lifetime, etc.

Figure 6:
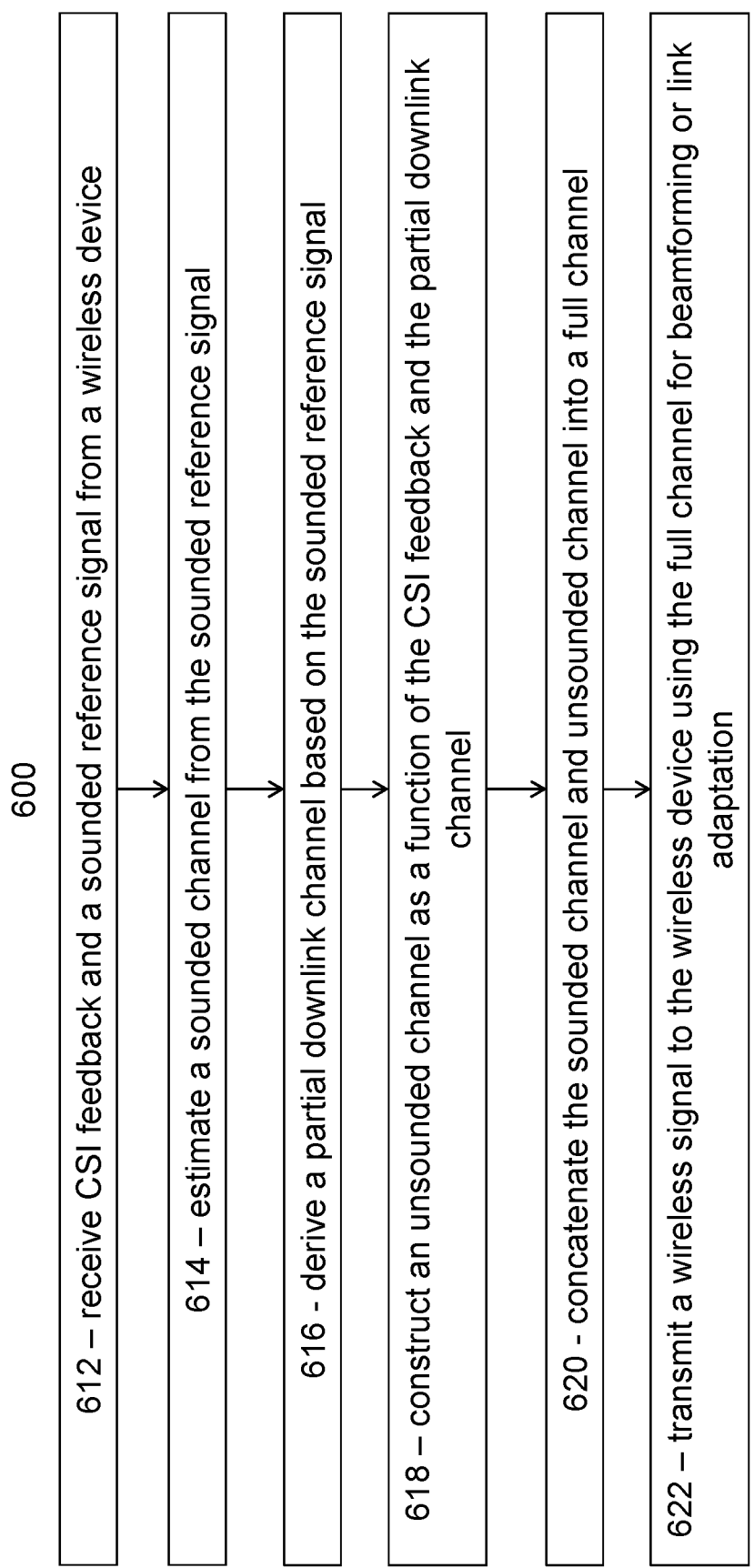
FIG. 6 is a flowchart illustrating an example method in a network node, according to certain embodiments.

FIG. 6 is a flowchart illustrating an example method 600 in a network node, according to certain embodiments. The network node, according to some embodiments, constructs an unsounded channel in a wireless network. The network node comprises more antennas than a wireless device and the wireless device comprises more than one receive antenna. In particular embodiments, one or more steps of FIG. 6 may be performed by network node 160 described with respect to FIG. 5.

Figure 1:
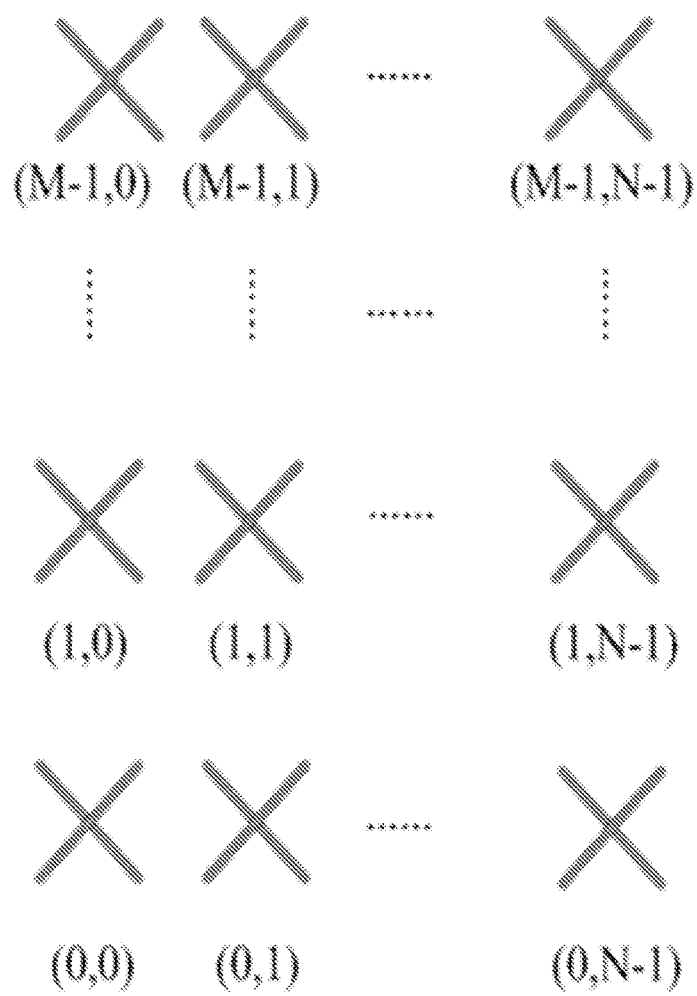
FIG. 1 is a block diagram illustrating a two-dimensional antenna element array.

The method begins at step 612 where a network node (e.g., network node 160) receives CSI feedback and receives a sounded reference signal from a wireless device. For example, wireless device 110 may perform measurements on a downlink signal received from the network node and send a feedback report to the network node describing characteristics of the received channel. The CSI feedback may include PMI, RI, CQI, beam index as described above with respect to FIG. 1. Wireless device 110 may also transmit one or more sounding reference signals to the network node.

At step 614, the network node estimates a sounded channel from the sounded reference signal. For example, the network node may estimate the sounded channel based on one or more of DMRS, SRS, PRACH or any other uplink reference signal as described above with respect to FIG. 1. At step 616, the network node derives a partial downlink channel based on the sounded reference signal.

At step 618, the network node constructs an unsounded channel as a function of the CSI feedback and the partial downlink channel. For example, the network node may construct the unsounded channel according to the methods described above in FIGS. 3 and 4.

At step 620, the network node concatenates the sounded channel and unsounded channel into a full channel. At step 622, the network node transmits a wireless signal to the wireless device using the full channel for beamforming or link adaptation.

Modifications, additions, or omissions may be made to method 600 of FIG. 6. Additionally, one or more steps in the method of FIG. 6 may be performed in parallel or in any suitable order.

Figure 7:
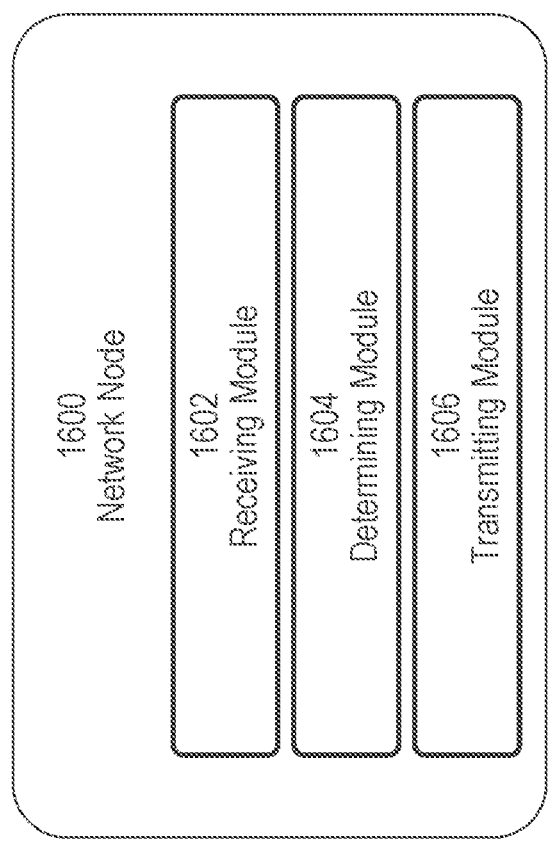
FIG. 7 illustrates an example network node, according to certain embodiments.

FIG. 7 illustrates an example network node, according to certain embodiments. The network node 1600 may comprise network node 160 illustrated in FIG. 5.

Network node 1600 is operable to carry out the example method described with reference to FIG. 6 and possibly any other processes or methods disclosed herein. It is also to be understood that the method of FIG. 6 is not necessarily carried out solely by apparatus 1600. At least some operations of the method can be performed by one or more other entities, including virtual apparatuses.

Network node 1600 may comprise processing circuitry such as 170 of FIG. 5. In some implementations, the processing circuitry may be used to cause receiving module 1602, determining module 1604, transmitting module 1606, and any other suitable units of network node 1600 to perform corresponding functions according one or more embodiments of the present disclosure.

As illustrated in FIG. 7, network node 1600 includes receiving module 1602, determining module 1604, and transmitting module 1606. In certain embodiments, receiving module 1602 may receive CSI feedback and a SRS from a wireless device according to any of the embodiments and examples described above. Determining module 1604 may estimate a sounded channel from the sounded reference signal, derive a partial downlink channel based on the sounded reference signal, construct an unsounded channel as a function of the CSI feedback and the partial downlink channel, and concatenate the sounded channel and unsounded channel into a full channel according to any of the embodiments and examples described herein. Transmitting module 1606 may transmit a wireless signal to the wireless device using the full channel for beamforming or link adaptation.

Figure 8:
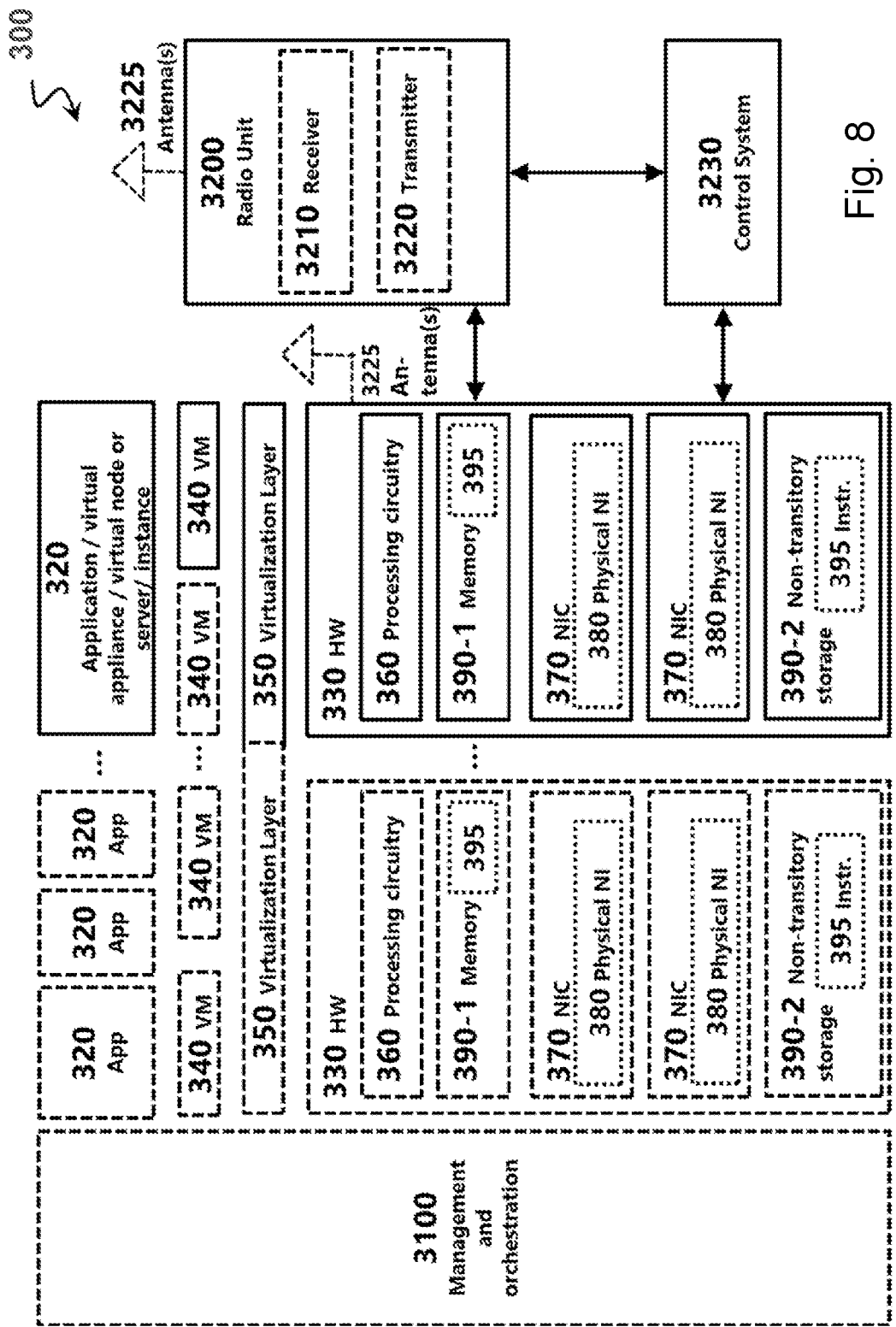
FIG. 8 illustrates an example virtualization environment, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein, such as the method of FIG. 6, may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method for use in a network node for constructing an unsounded channel in a wireless network wherein the network node comprises more antennas than a wireless device and the wireless device comprises more than one receive antenna, the method comprising:
   receiving channel state information (CSI) feedback and a sounded reference signal from the wireless device;
   estimating a sounded channel from the sounded reference signal;
   deriving a partial downlink channel based on the sounded reference signal;
   constructing an unsounded channel as a function of the CSI feedback and the partial downlink channel, wherein constructing the unsounded channel as a function of the CSI feedback and the partial downlink channel comprises:
      ordering columns of a precoding matrix indicator (PMI), or a variant of the PMI, included in the received CSI feedback;
      down-selecting a subset of the ordered columns;
      projecting the down-selected columns in a nulling space of the partial downlink channel;
      scaling the projection so that constructed unsounded channel is power comparable with the partial downlink channel;
   concatenating the sounded channel and unsounded channel into a full channel; and
   transmitting a wireless signal to the wireless device using the full channel for beamforming or link adaptation.

2. The method of claim 1, wherein ordering the columns of the PMI, or the variant of the PMI, comprises ordering each PMI, or variant of the PMI, column based on its distance from the sounded channel.

3. The method of claim 1, wherein down-selecting the subset of ordered columns comprises filtering out PMI columns associated with the partial downlink channel.

4. A network node operable to construct an unsounded channel in a wireless network wherein the network node comprises more antennas than a wireless device and the wireless device comprises more than one receive antenna, the network node comprising processing circuitry operable to:
   receive channel state information (CSI) feedback and a sounded reference signal from the wireless device;
   estimate a sounded channel from the sounded reference signal;
   derive a partial downlink channel based on the sounded reference signal;
   construct an unsounded channel as a function of the CSI feedback and the partial downlink channel, wherein the processing circuitry operable to construct the unsounded channel as a function of the CSI feedback and the partial downlink channel is operable to:
      order columns of a precoding matrix indicator (PMI), or a variant of the PMI, included in the received CSI feedback;
      down-select a subset of the ordered columns;
      project the down-selected columns in a nulling space of the partial downlink channel;
      scale the projection so that constructed unsounded channel is power comparable with the partial downlink channel;
   concatenate the sounded channel and unsounded channel into a full channel; and
   transmit a wireless signal to the wireless device using the full channel for beamforming or link adaptation.

5. The network node of claim 4, wherein the processing circuitry is operable to order the columns of the PMI, or the variant of the PMI, by ordering each PMI, or variant of the PMI, column based on its distance from the sounded channel.

6. The network node of claim 4, wherein the processing circuitry is operable to down-select the subset of ordered columns by filtering out PMI columns associated with the partial downlink channel.

7. A method for use in a network node for constructing an unsounded channel in a wireless network wherein the network node comprises more antennas than a wireless device and the wireless device comprises more than one receive antenna, the method comprising:
   receiving channel state information (CSI) feedback and a sounded reference signal from the wireless device;
   estimating a sounded channel from the sounded reference signal;
   deriving a partial downlink channel based on the sounded reference signal;
   constructing an unsounded channel as a function of the CSI feedback and the partial downlink channel, wherein constructing the unsounded channel as a function of the CSI feedback and the partial downlink channel comprises:
      ordering columns of a precoding matrix indicator (PMI), or a variant of the PMI, included in the received CSI feedback;

down-selecting a subset of the ordered columns;
obtaining a channel characteristic based on the sounded channel;
acquiring an approximation of right singular vectors based on the obtained channel characteristic;
constructing an intermediate matrix based on a subset of the approximation of right singular vectors and the down-selected columns;
decomposing the intermediate matrix to obtain linear combination weights;
determining the unsounded channel based on the subset of the approximation of right singular vectors and the obtained linear combination weights;
concatenating the sounded channel and unsounded channel into a full channel; and
transmitting a wireless signal to the wireless device using the full channel for beamforming or link adaptation.

8. The method of claim 7, wherein the channel characteristic comprises a transmitter correlation matrix.

9. The method of claim 8, wherein the transmitter correlation matrix is based on an estimated downlink channel for a first polarization.

10. The method of claim 8, wherein the transmitter correlation matrix is based on an estimated downlink channel for a first polarization and a second polarization.

11. The method of claim 8, wherein acquiring the approximation of the right singular vectors comprises acquiring the right singular vectors by singular value decomposition (SVD) or eigen value decomposition.

12. The method of claim 8, wherein acquiring the approximation of the right singular vectors comprises acquiring a subset of vectors comprising the first dominant singular vectors.

13. A network node operable to construct an unsounded channel in a wireless network wherein the network node comprises more antennas than a wireless device and the wireless device comprises more than one receive antenna, the network node comprising processing circuitry operable to:
receive channel state information (CSI) feedback and a sounded reference signal from the wireless device;
estimate a sounded channel from the sounded reference signal;
derive a partial downlink channel based on the sounded reference signal;
construct an unsounded channel as a function of the CSI feedback and the partial downlink channel, wherein the processing circuitry operable to construct the unsounded channel as a function of the CSI feedback and the partial downlink channel is operable to:
order columns of a precoding matrix indicator (PMI), or a variant of the PMI, included in the received CSI feedback;
down-select a subset of the ordered columns;
obtain a channel characteristic based on the sounded channel;
acquire an approximation of right singular vectors based on the obtained channel characteristic;
construct an intermediate matrix based on a subset of the approximation of right singular vectors and the down-selected columns;
decompose the intermediate matrix to obtain linear combination weights;
determine the unsounded channel based on the subset of the approximation of right singular vectors and the obtained linear combination weights;
concatenate the sounded channel and unsounded channel into a full channel; and
transmit a wireless signal to the wireless device using the full channel for beamforming or link adaptation.

14. The network node of claim 13, wherein the channel characteristic comprises a transmitter correlation matrix.

15. The network node of claim 14, wherein the transmitter correlation matrix is based on an estimated downlink channel for a first polarization.

16. The network node of claim 14, wherein the transmitter correlation matrix is based on an estimated downlink channel for a first polarization and a second polarization.

17. The network node of claim 14, wherein the processing circuitry is operable to acquire the approximation of the right singular vectors by acquiring the right singular vectors by singular value decomposition (SVD) or eigen value decomposition.

18. The network node of claim 14, wherein the processing circuitry is operable to acquire the approximation of the right singular vectors by acquiring a subset of vectors comprising the first dominant singular vectors.

* * * * *